May 17, 1938. M. M. HAMRICK ET AL 2,117,419
INSECT EXTERMINATOR, STERILIZER AND DRIER
Filed March 11, 1937 2 Sheets-Sheet 2

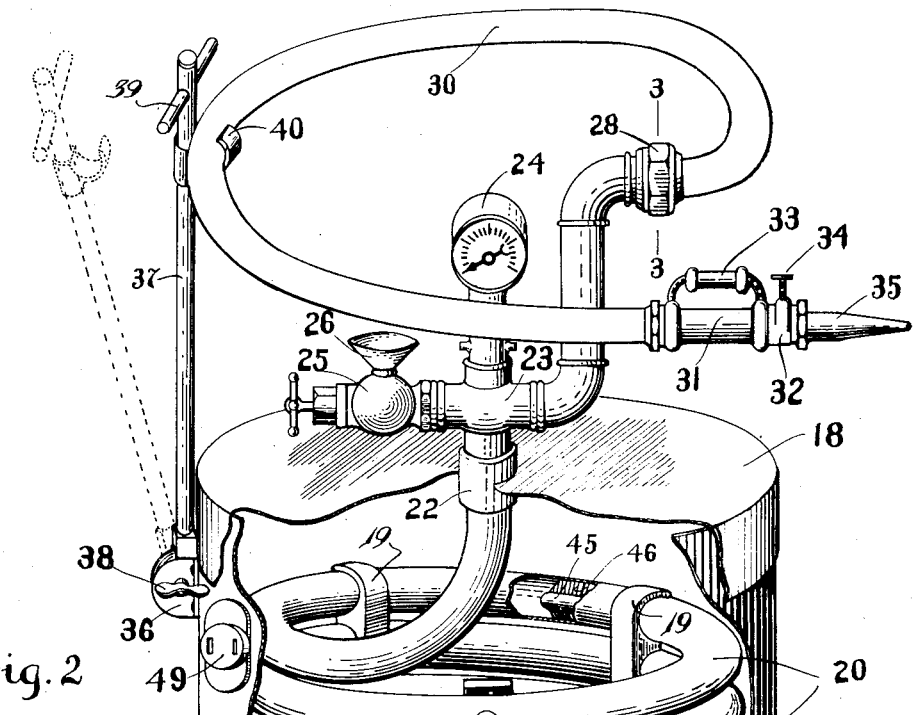
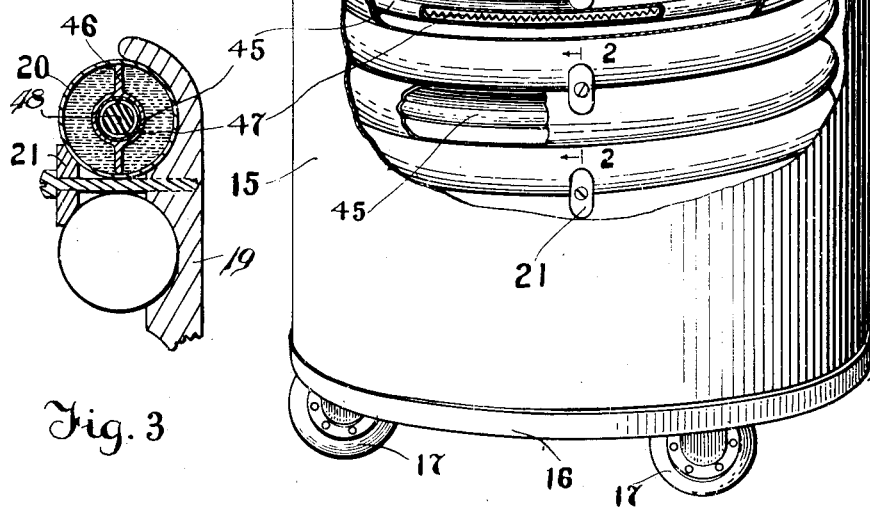
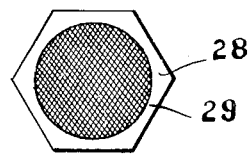

INVENTOR.
Marie M. Hamrick
BY Frank B. Spence
Warren E. Willis.
ATTORNEY.

Patented May 17, 1938

2,117,419

UNITED STATES PATENT OFFICE 2,117,419

INSECT EXTERMINATOR, STERILIZER, AND DRIER

Marie M. Hamrick and Frank B. Spence, New York, N. Y.

Application March 11, 1937, Serial No. 130,298

1 Claim. (Cl. 219—38)

This invention relates to an apparatus and process for exterminating insect pests from premises infested with them.

It is well known that steam at a high temperature, called dry steam because of apparent lack of moisture, causes instant death to such insects as may be contacted by it, and also kills their larvae, together with their unhatched spawn, due to the heat imparted, either with or without a liquid exterminator.

It is therefore an object of this invention to provide an efficient apparatus for quickly vaporizing the liquid with which it is supplied, the device being readily moved wherever desired and provided with interchangeable applicators to discharge the steam or vapor directly upon surfaces and into crevices infested by vermin.

A further feature is in the provision of means for controlling and directing the flow of steam, regulating and gaging the output and refilling the heater when its contents become exhausted.

Another aim is to produce a simple, compact apparatus capable of being operated by any person as readily, for instance, as a vacuum cleaner.

These and other similar objects are accomplished by the novel and practical construction, arrangement and combination of parts hereinafter described and illustrated in the accompanying drawings, constituting an essential component of this disclosure, and in which:—

Figure 1 is a perspective view of an embodiment of the invention, parts being broken away to show the construction.

Figure 2 is an enlarged fragmentary sectional view taken on line 2—2 of Fig. 1.

Figure 3 is a transverse sectional view taken on line 3—3 of Fig. 1.

Figure 4:
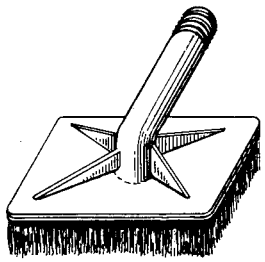
Figures 4 to 9 are perspective views of the applicators.
Figure 5:
Figure 6:
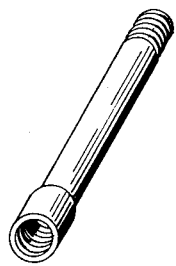
Figure 7:
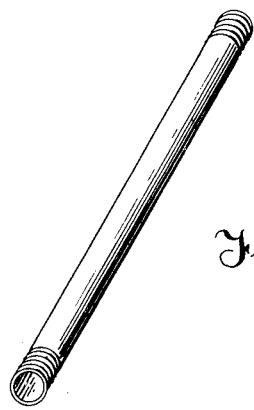
Figure 8:
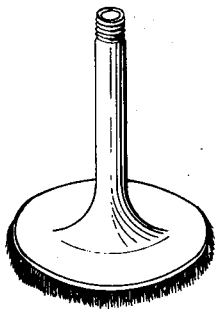
Figure 9:
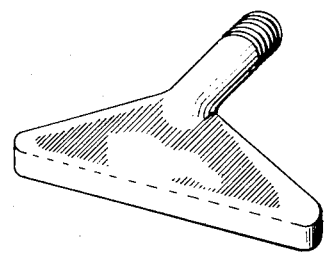

The apparatus, as disclosed in the drawings, consists of a metal casing 15 cylindrical in form, its bottom 16 supported by rubber tired castors 17 and its open top provided with a cover 18 having an annular flange disposed circumjacent the casing wall.

A series of upright posts 19 having inreaching curved lugs are arranged at spaced intervals within the casing, the lugs adapted to supportingly engage the several convolutions of a helical coil of liquid tight tubing 20, copper being preferred, of considerable diameter, the coil being secured by clips 21 bolted to the posts.

The lower end of the coil is closed and its upper end provided with a sleeve 22, screw threaded to engage in the lower upright member of a cross shaped fitting 23 disposed above the cover.

Directly thereabove is a pipe connecting a combined pressure gage and safety valve 24, while in one of the lateral openings of the fitting is engaged an inlet valve 25 having a funnel shaped receiver 26 by which liquid may be entered, when the valve, normally closed, is opened.

At the opposite opening of the fitting 23 are rigid pipe connections leading to a union 28, in which is a fine meshed filtering screen 29, and connected by the union is a length of flexible steam hose 30 provided at its outer end with a coupling tube 31 with which is combined an outlet valve 32.

The tube 31 is provided with an insulated handle 33 and the valve handle 34 is also heat insulated. Various attachments in the form of applicators, as at 35, are directly engageable in the valve opening and take the form of brushes, sprayers, etc., to distribute spray wherever required.

Attached to the casing is a bracket 36 in which is hingedly engaged a bar 37, a set screw 38 being arranged to retain the bar in adjusted position, the bar having a cross handle 39 at its free end by which the entire apparatus may be moved from place to place as required.

A clip 40 on the bar serves as a support for the hose 30 to prevent it from trailing on the floor when moving the apparatus.

The heater, by which the entered liquid is vaporized at a high temperature, consists of a thin walled copper tube 45 of a diameter far less than that of the outer tube 20 and is coiled to be entirely enclosed within it, being held centrally by fins 46 or similar means, and is closed at its ends.

Disposed within the inner tube 45, but insulated throughout, is a coil of high resistance wire 47 embedded in insulating cement 48 and having its respective ends connected by conductors to the terminals of a socket 49, fixed on the casing to receive current from any convenient source of electrical energy, as the ordinary house current.

In operation, the space between the tubes 20 and 45 is supplied with liquid, poured into the funnel 26 when the valve 25 is open; the valve is then closed and the electrical connection made at the socket 49, whereupon heat is immediately generated in the coil 47 and transmitted to the liquid, turning it into steam, the pressure of which shows on the gage 24.

Steam entering the hose 30, is delivered through the applicator 35, which is directed by the handle 33 and controlled by the valve 32.

It will be understood that a section of rigid pipe may be inserted between the valve 32 and applicator 35 if desired, and it will be obvious that the entire apparatus is self-contained, no tools or other equipment being required for its operation. It will also be apparent that the device can be used as heater to raise the temperature of a room, if so desired.

Although the foregoing is generally descriptive of the best known embodiment of the invention, it is not to be regarded as limitative thereof, as changes may be made within the scope of the appended claim.

Having thus described the invention and set forth the manner of its construction and application, what is claimed as new and sought to secure by Letters Patent, is:—

In a boiler comprising a round tube plurally coiled in circular formation and having a heating means therewithin, a cylindrical open topped casing enclosing said coiled tube, a marginally flanged cover removably engaged on said casing, means combined with said cover constituting the sole support for said coiled tube, means for supplying liquid to said tube, a flexible hose connected with said tube above said cover, a support for said hose adjustably engaged on said casing, applicators selectively engageable with the hose outlet, a bow-shaped handle spacedly connected to the hose adjacent its outlet and a valve combined with said handle controlling the passage through said hose.

MARIE M. HAMRICK.
FRANK B. SPENCE.